US009919703B2

(12) United States Patent
Stefan

(10) Patent No.: US 9,919,703 B2
(45) Date of Patent: Mar. 20, 2018

(54) METHOD AND DEVICE FOR ASSISTING A MANEUVERING PROCESS OF A MOTOR VEHICLE

(71) Applicant: FORD GLOBAL TECHNOLOGIES, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/988,169

(22) Filed: Jan. 5, 2016

(65) Prior Publication Data
US 2016/0193996 A1 Jul. 7, 2016

(30) Foreign Application Priority Data

Jan. 6, 2015 (DE) .................. 10 2015 200 044

(51) Int. Cl.
*B60W 30/06* (2006.01)
*B60W 40/02* (2006.01)
*B62D 15/02* (2006.01)

(52) U.S. Cl.
CPC ............ *B60W 30/06* (2013.01); *B60W 40/02* (2013.01); *B62D 15/0285* (2013.01); *B60Q 2400/50* (2013.01); *B60W 2540/04* (2013.01); *B60W 2900/00* (2013.01)

(58) Field of Classification Search
CPC .. B60W 30/06; B60W 40/02; B60W 2540/04; B60W 2900/00; B62D 15/0285; B60Q 2400/50
See application file for complete search history.

(56) References Cited

U.S. PATENT DOCUMENTS 9,061,705 B2 6/2015 Kwon
2010/0274414 A1* 10/2010 Park ...................... B60W 30/06
701/2
2011/0057813 A1* 3/2011 Toledo ...................... B60T 7/22
340/932.2

(Continued)

FOREIGN PATENT DOCUMENTS

DE 102009051463 A1 5/2011
DE 102011114317 A1 3/2013

(Continued)

*Primary Examiner* — Courtney D Heinle
(74) *Attorney, Agent, or Firm* — Brooks Kushman P.C.

(57) ABSTRACT

A device and a method for assisting an automatic/automated maneuvering process, such as a parking maneuver, of a motor vehicle. The automated maneuvering assistance system plans a movement path for the vehicle, determines a recommended position outside of the vehicle from which a vehicle operator can effectively visually monitor the vehicle following the movement path; and communicates the recommended position to the operator. The recommend monitoring position may be communicated to the operator by the vehicle lights, such as by projecting a light beam onto a ground surface adjacent to the vehicle at the recommended position, or by transmitting data identifying the recommended position to a wireless communication device operated by the operator. Initiation of the movement of the vehicle along the path may require a confirmation that the operator is in the recommended position.

5 Claims, 2 Drawing Sheets

(56) References Cited

U.S. PATENT DOCUMENTS

| | | | | |
|---|---|---|---|---|
| 2013/0038715 A1* | 2/2013 | Ichikawa | ............... | B60K 6/445 |
| | | | | 348/118 |
| 2013/0120572 A1* | 5/2013 | Kwon | ................ | B62D 15/0295 |
| | | | | 348/148 |
| 2014/0058613 A1* | 2/2014 | Leinfelder | ........... | B62D 15/028 |
| | | | | 701/28 |
| 2014/0222252 A1* | 8/2014 | Matters | ................ | B62D 15/027 |
| | | | | 701/2 |
| 2015/0032323 A1* | 1/2015 | Nijakowski | ............. | B60T 8/885 |
| | | | | 701/23 |
| 2015/0073661 A1* | 3/2015 | Raisch | ................ | B62D 15/027 |
| | | | | 701/41 |
| 2015/0149265 A1* | 5/2015 | Huntzicker | ........... | B60W 30/06 |
| | | | | 705/13 |
| 2015/0203111 A1* | 7/2015 | Bonnet | ................ | B62D 15/027 |
| | | | | 701/25 |
| 2015/0375741 A1* | 12/2015 | Kiriya | ................ | G06K 9/00355 |
| | | | | 701/2 |
| 2016/0075325 A1* | 3/2016 | Kim | ..................... | B60W 30/06 |
| | | | | 701/23 |
| 2016/0170494 A1* | 6/2016 | Bonnet | ................... | G06F 3/017 |
| | | | | 345/173 |
| 2016/0207528 A1* | 7/2016 | Stefan | ................... | B60W 30/06 |
| 2016/0224025 A1* | 8/2016 | Petel | ................... | B62D 15/0285 |
| 2016/0229398 A1* | 8/2016 | Baumgaertel | ..... | B60W 30/0956 |

FOREIGN PATENT DOCUMENTS

| | | |
|---|---|---|
| DE | 102012212900 A1 | 1/2014 |
| EP | 2700566 A2 | 2/2014 |
| JP | 2007265288 A | 10/2007 |

* cited by examiner

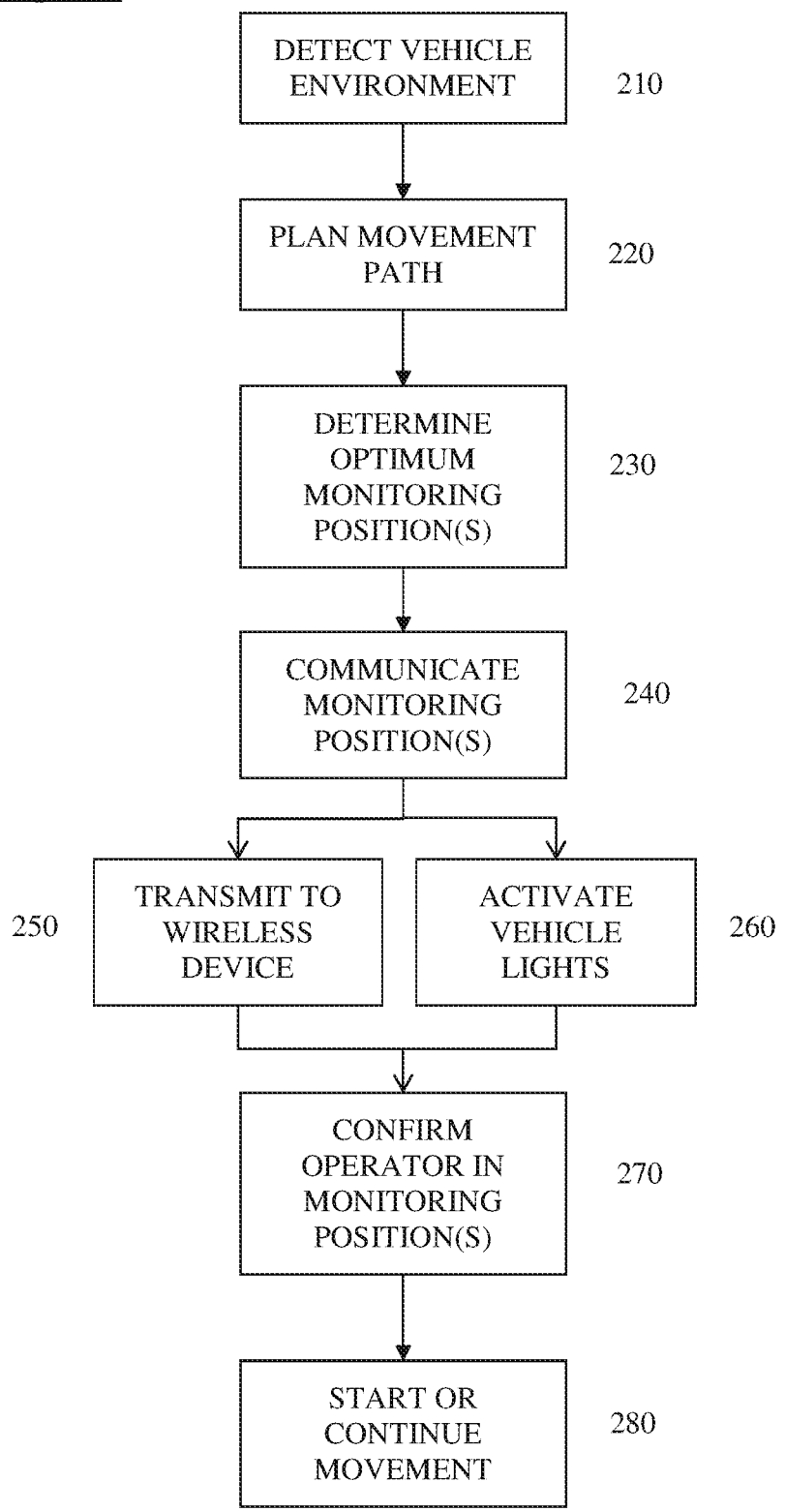

METHOD AND DEVICE FOR ASSISTING A MANEUVERING PROCESS OF A MOTOR VEHICLE

CROSS-REFERENCE TO RELATED APPLICATIONS

This application claims foreign priority benefits under 35 U.S.C. § 119(a)-(d) to DE 10 2015 200 044.3 filed Jan. 6, 2015, which is hereby incorporated by reference in its entirety.

TECHNICAL FIELD

The present invention relates to a method and a device for assisting a maneuvering process of a motor vehicle.

BACKGROUND

Future generations of parking assistance devices will make it possible for the driver to cause a parking maneuver to be automatically executed after he has exited the vehicle. This will, for example, make it possible to park the vehicle in very narrow parking spaces. Typically, in this context the driver starts the parking assistance device, leaves the vehicle, and then must issue certain commands during the entire parking maneuver (by actuating a button or certain apps, for example). According to existing law, the driver is still always responsible for monitoring the maneuver here, which assumes that the driver has control of the maneuver at all times.

DE 10 2009 051 463 A1 discloses, inter alia, a motor vehicle with an associated external control device and a parking and steering assistance system which has a motor-vehicle-side control device designed to determine local information about the location of the driver and/or a target location predefined by the driver, wherein a process of leaving a parking space controlled by this control device is executed taking into account local information in order to better coordinate the process of leaving a parking space with the driver's wishes.

DE 10 2011 114 317 A1 discloses, inter alia, a method for automatically maneuvering a vehicle and a driver assistance device, wherein the driver is identified by a detection device of the vehicle during a maneuvering process, and wherein the maneuvering process is at least interrupted when the driver is located at least outside a picture area of a picture taken by the detection device.

EP 2 700 566 A2 discloses, inter alia, a method for operating a vehicle which executes an independently controlled forward movement, wherein during the process of independently moving forward, the respective current position of the vehicle and the current head orientation and/or viewing direction of the operator is determined, and wherein in specified situations, for example when the operator does not look in the direction of the vehicle for longer than a specified time period, the process of moving the vehicle forward independently is automatically interrupted or terminated.

SUMMARY

It may be an unfamiliar and unusual situation for a vehicle driver/operator to be located outside the vehicle while controlling a vehicle maneuvering process, such as a parking maneuver. Optimum positioning and preparation with respect to the vehicle during a maneuvering process are particularly important in order to effectively monitor the entire maneuvering process and identify any sudden changes in the surroundings (such as the approach of another vehicle, a bicycle, pedestrian or animal).

The present disclosure presents a method and device for assisting a maneuvering process (such as an automatic/automated parking maneuver) of the motor vehicle which enable an automatic/automated maneuvering process to be safely performed.

A method for assisting an automated maneuvering process of a motor vehicle, wherein the maneuvering process is performed automatically with monitoring by a driver while the driver is located in a monitoring position outside the motor vehicle has following steps:

determination of a recommended or preferred monitoring position on; and communication of this preferred monitoring position to the vehicle operator.

The invention provides a device and method which make it possible to determine an optimum or preferred monitoring position of the vehicle operator (hereinafter designated the "recommended position") in situations in which the operator monitors an automated maneuvering process, in particular a parking maneuver. By communicating this "recommended position" to the vehicle operator, enhanced control of the maneuvering process, and hence safe execution, for example, of a parking maneuver, are consequently made possible.

According to one embodiment, the communication of the recommended monitoring position comprises the generation of at least one visible signal.

The communication of the recommended monitoring position can in particular comprise the projection of this monitoring position onto the ground.

Furthermore, the communication of the recommended monitoring position can comprise data transmission via a wireless communications link to a mobile unit carried by the operator, such as a smartphone, a remote control, augmented reality glasses/headgear ("smart glasses"), or the like.

According to one embodiment, a recommended monitoring position is determined once for the entire maneuvering process in at least one operating mode.

According to one embodiment, a recommended monitoring position is determined several times for different phases of the maneuvering process in at least one operating mode.

According to one embodiment, the vehicle operator is provided with a warning when an imminent change in a recommended monitoring position is determined.

According to one embodiment, after a change in the recommended monitoring position has been determined, continuation of the maneuvering process is not enabled until the vehicle operator has assumed the changed monitoring position.

The invention furthermore relates to a device for assisting a maneuvering process of a motor vehicle, wherein the maneuvering process can be executed automatically/autonomously with monitoring by a vehicle operator while the operator is located in a monitoring position outside the motor vehicle, wherein the device is designed to perform a method having the above-described features. With regard to advantages and preferred embodiments of the device, reference is made to the statements relating to the method according to the invention.

The invention will be explained further below using a preferred exemplary embodiment with reference to the accompanying figure.

BRIEF DESCRIPTION OF THE DRAWINGS

FIG. 2 shows a flow chart depicting a sequence of steps of an exemplary embodiment of a method according to the invention.

DETAILED DESCRIPTION

Figure 1:
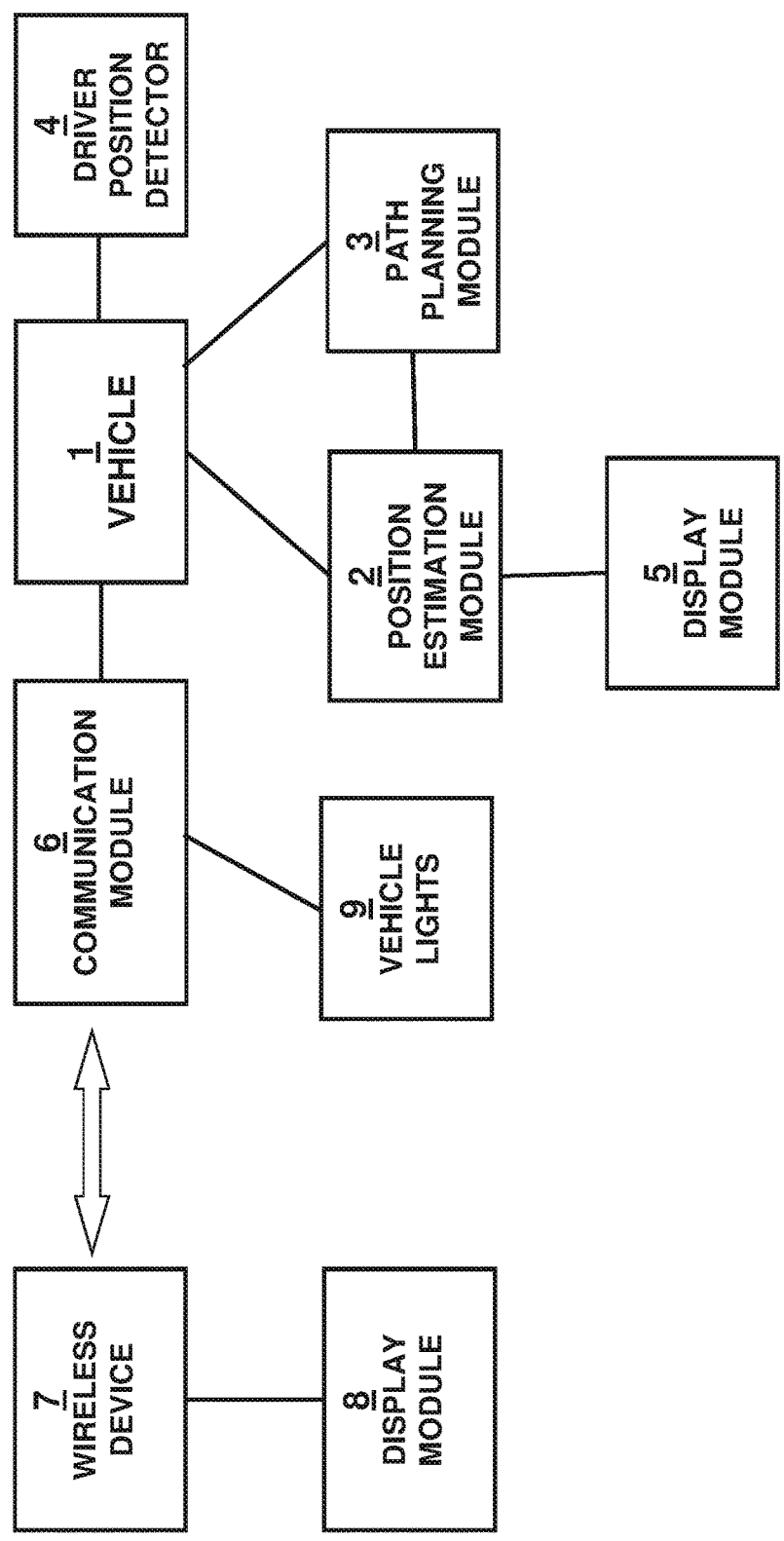
FIG. 1 shows a block diagram schematically depicting an exemplary embodiment of a device according to an embodiment of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to FIG. 1, a vehicle 1 equipped with apparatus according to the invention has a module 2 for (statistically or dynamically) estimating the optimum vehicle operator position, or the preferred/recommended monitoring position of the operator, during an automated maneuvering process. In particular, the fulfillment of one or more of the following conditions can be established as a criterion for selecting this recommended monitoring position:

- after assuming the recommended monitoring position, the vehicle operator should be able to have an overview of the entire length of the vehicle.
- after assuming the recommended monitoring position, the operator should not be located on the travel path.
- after assuming the recommended monitoring position, the operator should be located at a sufficiently safe distance from the vehicle.
- after assuming the recommended monitoring position, the operator should be not be located on the designated movement path of the vehicle.
- after assuming the recommended monitoring position, the operator should be able to monitor the surroundings of the vehicle, and in particular the area toward which the vehicle is moving.

A module for planning the relevant movement path or trajectory of the vehicle is designated by "3". Another optional module 4 serves to estimate the current position outside the vehicle at which the vehicle operator is currently located.

The exemplary method described in FIG. 2 begins with one or more vehicle sensors detecting pertinent aspects of the vehicle environment, such as the locations of obstacles (step 210), in a manner well known in the art. Next, the automated maneuvering assistance system plans a movement path which the vehicle will follow to execute the maneuver (such as parking) in order to avoid obstacles (step 220). At step 230 the maneuvering assistance system determines a recommended monitoring position for the vehicle driver/operator to assume from which the operator can effectively monitor the vehicle movement along the path. The recommended monitoring position is communicated to the operator at step 240.

"5" designates a display module for displaying the determined optimum/recommended observation position (such as by projecting onto the ground, or with a light signal). The optimum/recommended position can hence be transmitted by the vehicle itself, or by, for example, projecting the ideal position onto the ground, or by activating the vehicle lights 9 (for example the front or rear taillights, flashing indication lights or any LEDs additionally mounted for this purpose) of the vehicle (FIG. 2, step 260). In other embodiments, the recommended optimum position for the vehicle operator can be transmitted (alternatively or in addition) by to a wireless communication device (FIG. 2, step 250), such as a remote control, smartphone, augmented reality glasses/headgear ("smart glasses"), or the like which the operator can also use for remote control of the maneuvering process.

A communication module 6 serves for exchanging data with an external wireless device 7. "8", designates an (optional) module for displaying the position, which can be a display on a smartphone, a 360° view on the remote wireless device 7, or the like.

In a first operating mode, a single optimum position for the entire maneuvering process can be determined and communicated, so that this first operating mode can also be designated the "static position mode." The trigger for operating in this first operating mode can be, for example, the corresponding selection or activation by the vehicle operator, the occurrence of a comparatively simple parking/unparking maneuver comprising only a small number of corrective maneuvers (for example less than "N" corrective maneuvers), such as parking/unparking in only one direction of movement, or the fact that all recommended positions for the maneuver are located in the same area.

In a second operating mode, several recommended monitoring positions which are different from each other can be sequentially communicated to the vehicle operator when transitioning from one maneuvering phase into the next maneuvering phase with the result that this operating mode can also be designated a "dynamic monitoring mode". The trigger for operating in this second operating mode can in turn be, for example, a selection or activation of the mode made by the vehicle operator, the occurrence of a comparatively complex parking/unparking maneuver comprising a large number of corrective maneuvers (such as with more than N corrective maneuvers), or the occurrence of a comparatively complicated parking situation (such as parking in a very narrow parking place next to the curb).

The vehicle operator is preferably warned by a suitable warning signal in the event of an imminent change in the optimum observation/monitoring position being identified, so that the operator has sufficient time to assume a new observation/monitoring position. In some embodiments, the initial and/or respective next phase of the maneuvering process can furthermore be enabled or initiated only after the vehicle operator is confirmed to have assumed the recommended ideal observation position (FIG. 2, step 270-280).

One or more of the modules 2-8 may be microprocessor-based, such as a computer having a central processing unit, memory (RAM and/or ROM), and associated input and output buses. One or more of the modules 2-8 may be an application-specific integrated circuit or other logic devices known in the art. One or more of the modules may be a portion of a central vehicle main control unit, an interactive vehicle dynamics module, a powertrain control module, or may be a stand-alone controller as shown. It will be apparent to one of skill in the vehicle electronics arts that FIG. 1 is but one of many possible system architectures that may be used to effect monitoring and control of the various systems as disclosed herein. The disclosed functionality may be distributed differently among one or more of the various control modules and remain within the scope of the invention.

The embodiments of the present invention as set forth herein generally illustrate and describe a plurality of modules, or other such electronics-based components. All references to the various modules and electronics-based components, and the functionality provided for each, are not intended to be limited to encompassing only what is illustrated and described herein. While particular labels may be assigned to the various electronic modulus and/or electrical components disclosed, such labels are not intended to limit the scope of operation for the modules and/or the electrical components. The modules may be combined with each other and/or separated in any manner based on the particular type of electrical architecture that is desired or intended to be implemented in the vehicle. It is generally recognized that each module and/or device disclosed herein may include, but not limited to, any number of microprocessors, ICs, memory devices (e.g., FLASH, RAM, ROM, EPROM, EEPROM, or other suitable variants thereof), and appropriate software which co-act with one another to perform the various functions set forth below.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating an automated maneuvering assistance system of a motor vehicle, comprising:
   planning a movement path for the vehicle; and
   in response to identifying a recommended position outside of the vehicle and outside of the movement path from which a vehicle operator can effectively visually monitor the vehicle following the movement path, projecting at least one visible light beam onto a ground surface adjacent to the vehicle at the recommended position.

2. The method of claim 1, further comprising initiating movement of the vehicle along the path after confirming the operator is in the recommended position.

3. The method of claim 1 further comprising, communicating the recommended position by transmitting data identifying the position to a wireless communication device operated by the operator.

4. The method of claim 1, further comprising determining a plurality of recommended monitoring positions, each of the positions of the plurality being determined for a discrete portion of the movement path.

5. The method of claim 4, further comprising issuing a warning to the operator to indicate a change to a subsequent recommended monitoring position in the plurality is required.

* * * * *